Nov. 17, 1925.

J. L. BURNS 1,562,144

FRICTION CLUTCH

Filed July 17, 1923    6 Sheets-Sheet 3

John L. Burns INVENTOR.

BY

Parsons & Bodell ATTORNEYS.

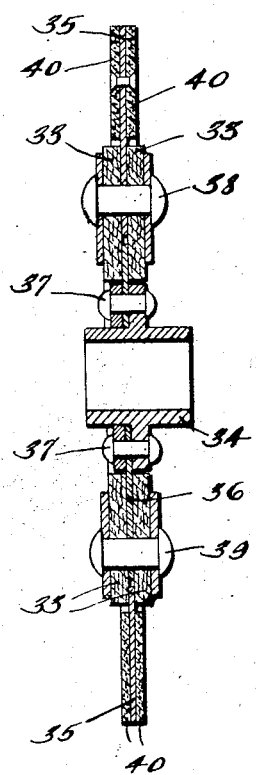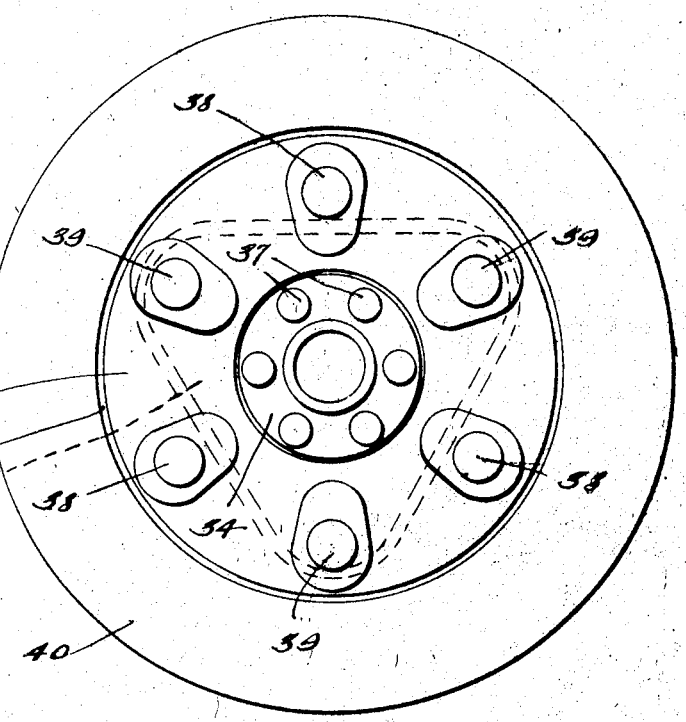

Nov. 17, 1925.

J. L. BURNS 1,562,144

FRICTION CLUTCH

Filed July 17, 1923   6 Sheets-Sheet 5

John L. Burns INVENTOR.

BY

Parsons & Brodell ATTORNEYS.

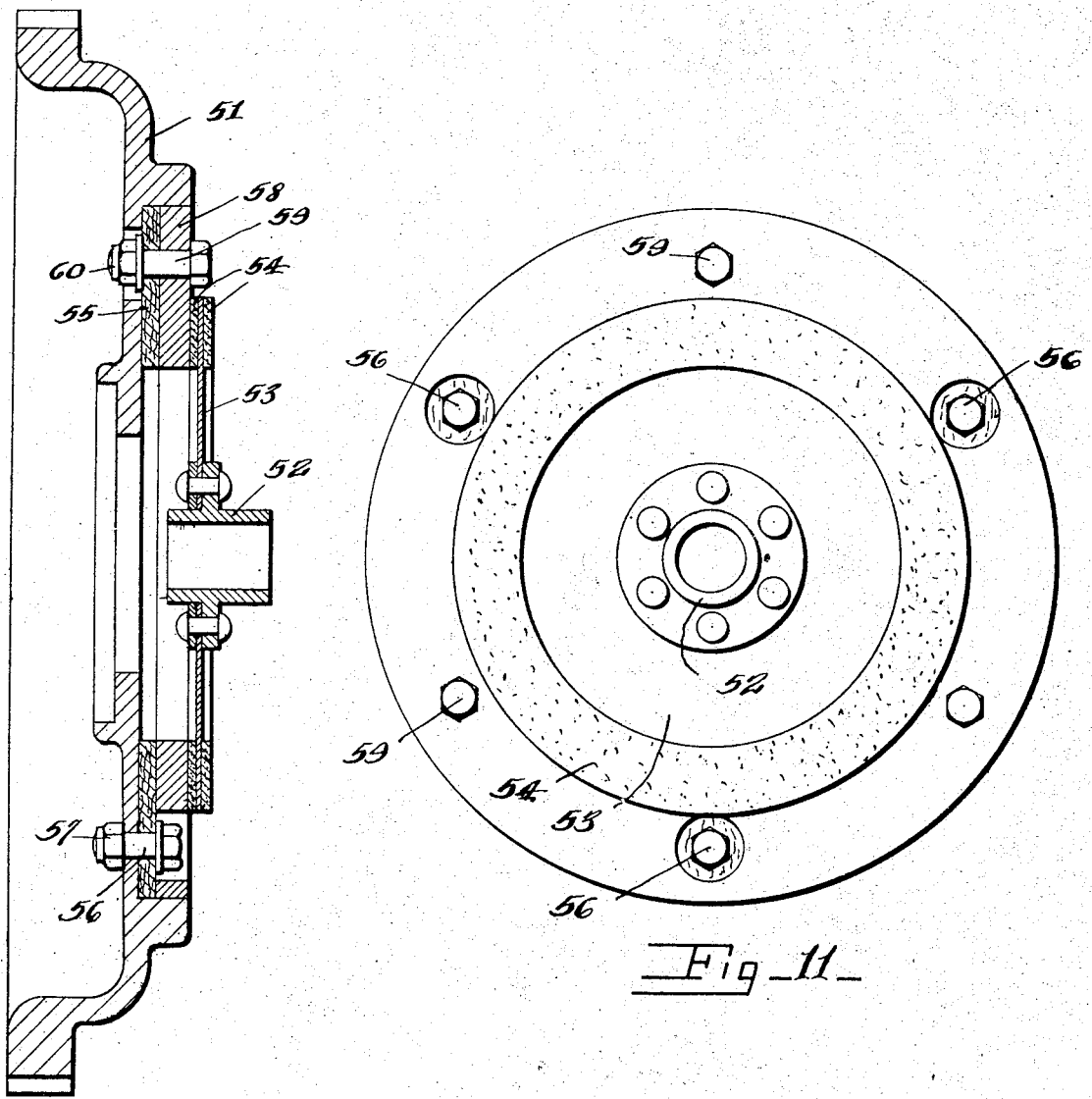

Patented Nov. 17, 1925.

1,562,144

UNITED STATES PATENT OFFICE.

JOHN L. BURNS, OF SYRACUSE, NEW YORK.

FRICTION CLUTCH.

Application filed July 17, 1923. Serial No. 652,167.

*To all whom it may concern:*

Be it known that I, JOHN L. BURNS, a citizen of the United States, and a resident of Syracuse, in the county of Onondaga and State of New York, have invented a certain new and useful Friction Clutch, of which the following is a specification.

This invention relates to clutches as friction clutches, such as are used in motor vehicles and has for its object a clutch construction by which the torque or driving force is more or less yieldingly transmitted and by which engine vibrations and noises are absorbed instead of being transmitted through the clutch to the body of the vehicle and other parts.

The invention consists in the novel features and in the combinations and constructions hereinafter set forth and claimed.

In describing this invention, reference is had to the accompanying drawings in which like characters designate corresponding parts in all the views.

Figures 6 and 7 are views similar to 1 and 2 of another form of this clutch construction.

Figure 1:
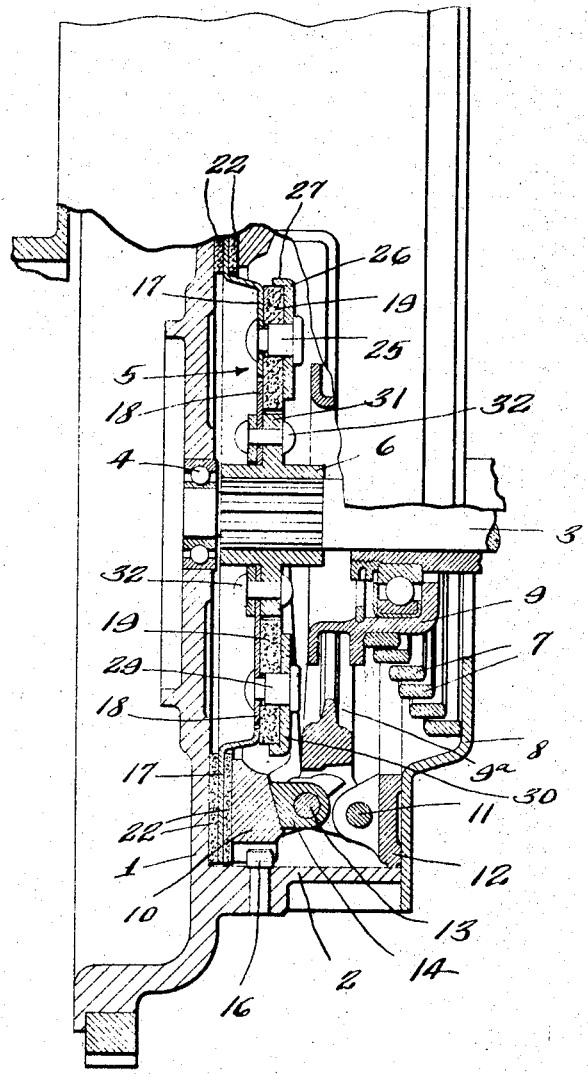
Figure 1 is a vertical sectional view, partly in elevation of a clutch embodying my invention.
Figure 2:
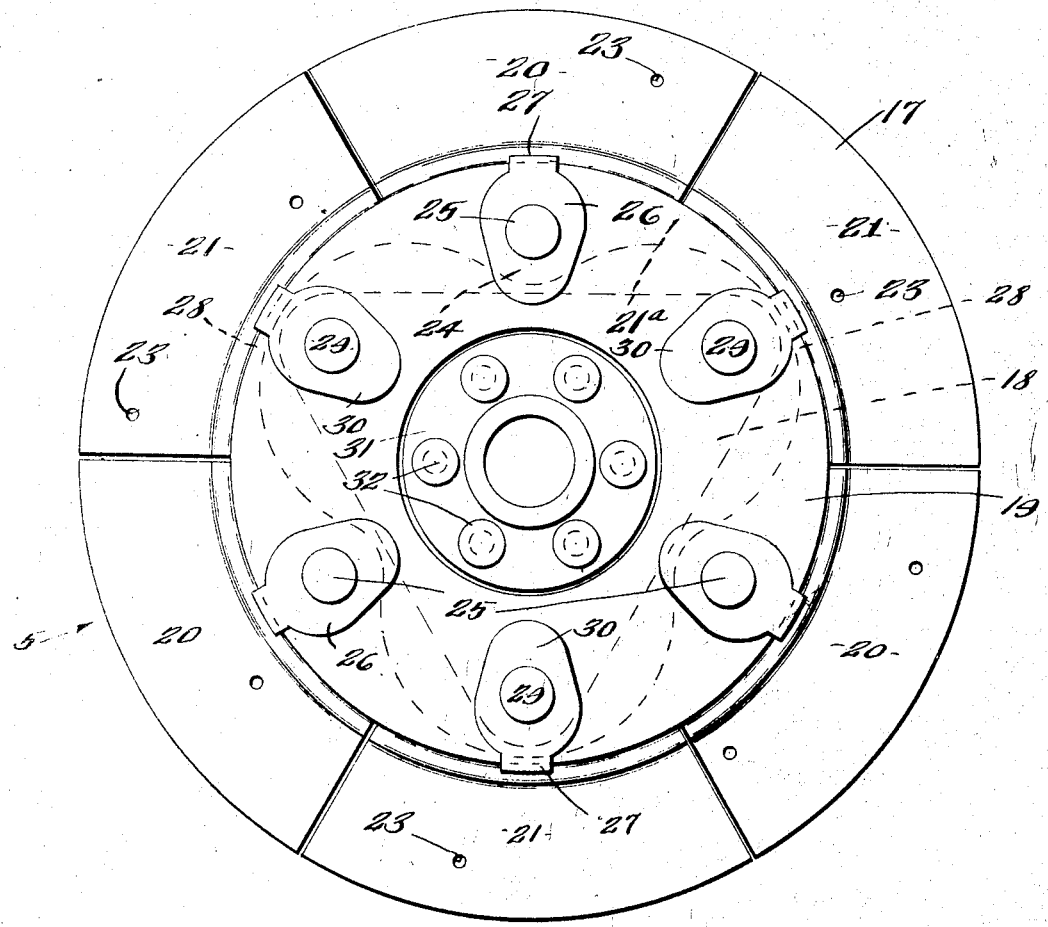
Figure 2 is an elevation of the driven member of the clutch, the friction rings on the face thereof being removed.
Figure 3:
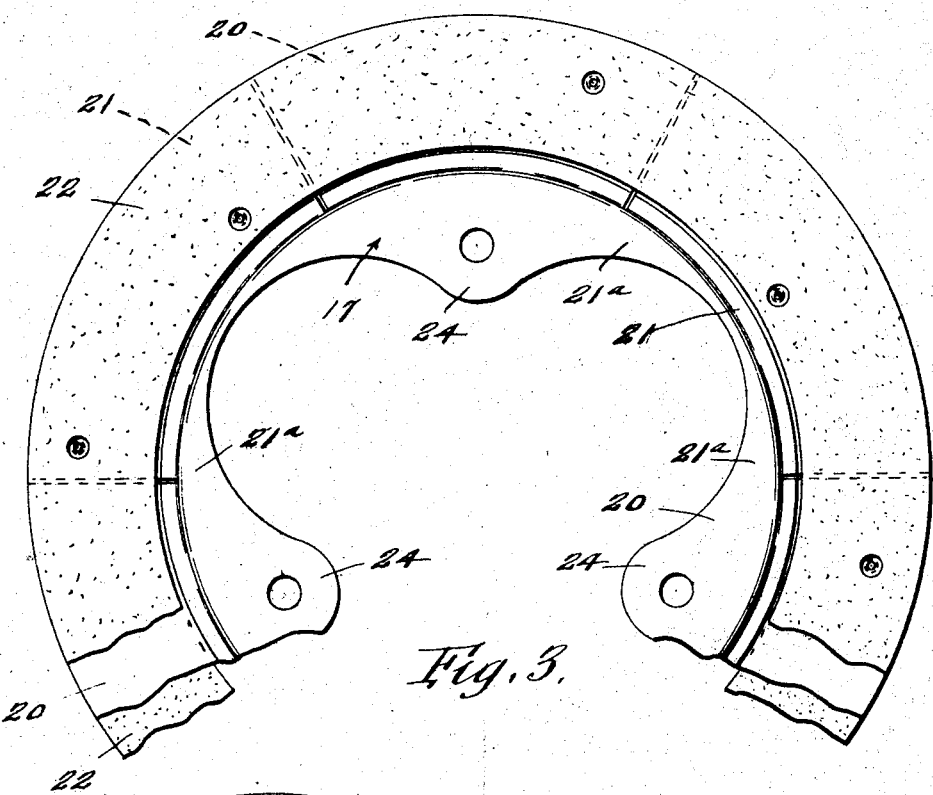
Figure 3 is a fragmentary face view of the outer annular section of the driven element.
Figures 4, 5:
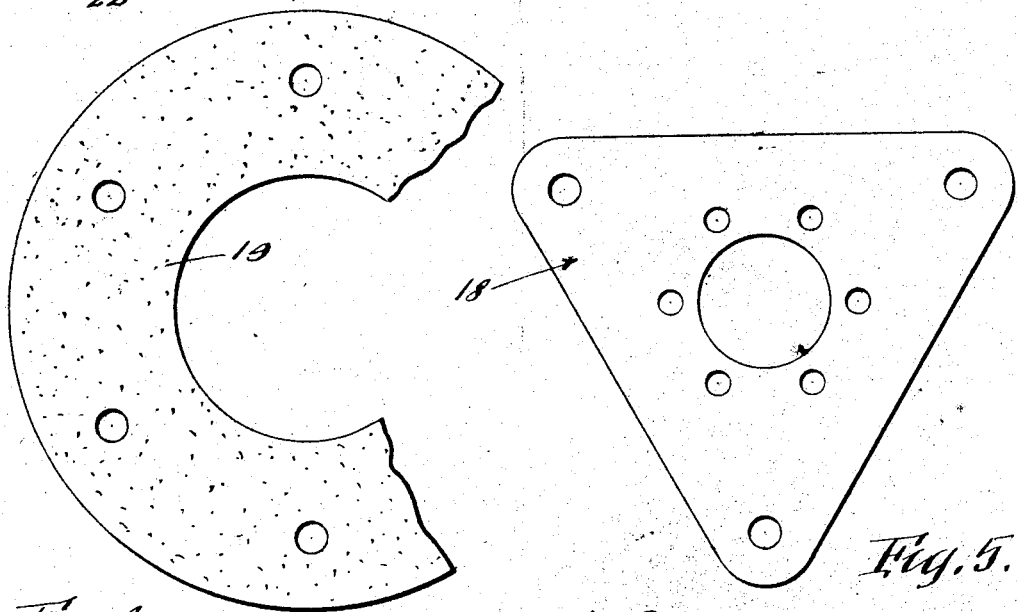
Figure 4 is a fragmentary face view of the fibrous motion transmitting ring.
Figure 5 is a face view of the inner section of the driven element.
Figures 8, 9:
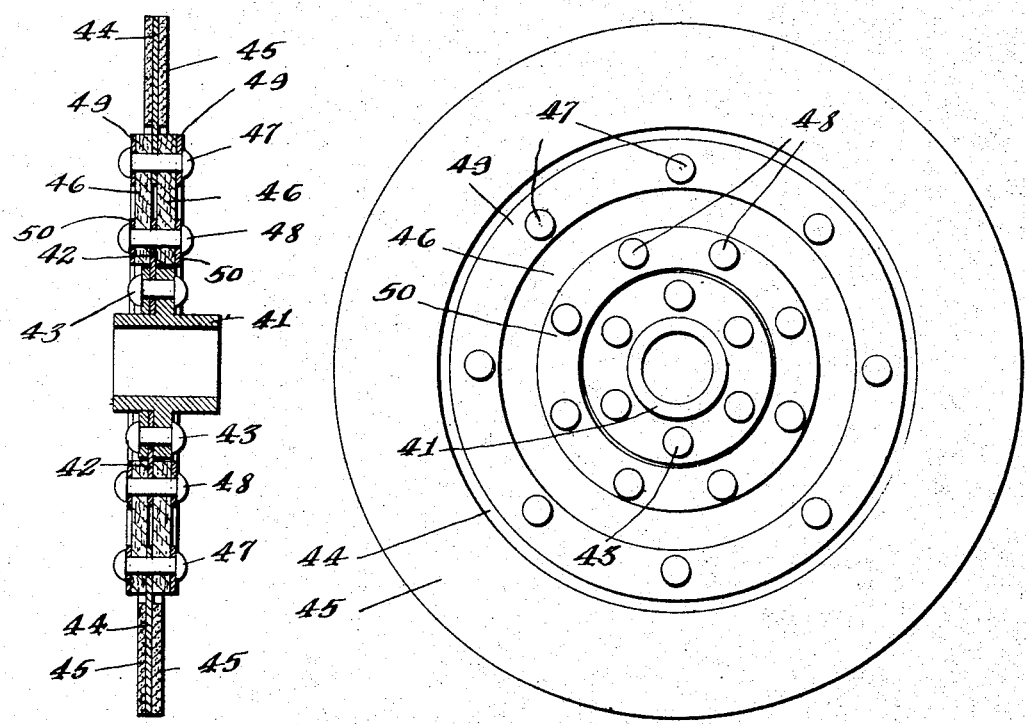

Figures 8 and 9 are views similar to Figures 1 and 2 of the third form and Figures 10 and 11 are views similar to Figures 1 and 2 of the fourth embodiment of my invention.

This clutch comprises generally driving and driven elements, one of which, usually the driven element, is shiftable axially out of engagement with the driving element and one of those elements, preferably the driven element, comprising driving and driven parts and a more or less flexible or slightly flexible member connected to said parts for transmitting the motion from one to the other, this member being a sound and vibration absorbing material and usually being of a cotton rubber fabric or any other suitable material which has strength enough to transmit the driving force.

In the clutch here illustrated, the driving element is a part of or attached to the flywheel of the internal combustion engine, and the driven element is arranged substantially coaxially with the driving element and includes an axially shiftable disk and a spring for shifting the disk into engagement with the driving element and operating mechanism for shifting the disk out of engagement with the driving element against the force of the spring.

1 designates the driving element or flywheel of the engine, this driving element having a cylindrical cavity formed by providing a drum 2 on the rear face of the driving element or flywheel. 3 is the driven shaft forming part of the driven element, this shaft being arranged coaxially with the driving element and the shaft having a pilot bearing at 4 in the driving element. 5 is a plate or disk having a hub 6 slidable axially on the shaft 3 to carry the plate or disk into and out of frictional engagement with the driving element 1. 7 is a powerful spring interposed between the cover plate 8 for the drum 2 and a sliding collar 9 rotatably and slidably mounted on the shaft 3. 9ᵃ is one of a plurality of levers interposed between the collar 9 and a compression ring 10 for transmitting the motion of the collar 9 to the compression ring which coacts with the plate 5 to compress it against the driving element 1. The lever 9ᵃ is pivoted at 11 to a ring 12 suitably attached to the drum 2 to rotate therewith and at 13 to a shoe or wedge 14 coacting with an inclined face on the compression ring 10. The compression ring 10 is suitably connected or keyed as at 16 to the drum 2 to rotate therewith.

It will be understood by those skilled in the art that there are a plurality of levers 9ᵃ spaced equidistant apart around the collar 9. The collar 9 is shiftable in one direction by the spring 7 and in the other direction by a shifting lever or pedal unnecessary to describe. The clutch, as thus far described, forms no part of this invention.

The plate 5 of the driven element comprises driving and driven parts and a sound and vibration absorbing flexible member between said parts for transmitting the motion from one part to the other.

More specifically, the plate comprises inner and outer parts or sections concentrically mounted relatively to the shaft 3 and spaced apart in radial directions from each other and a ring of fibrous material connected to both of said sections at spaced-apart points in a direction about the axis of the clutch or the shaft 3, and usually the points of connection between the outer section alternate with the points of connection between the fibrous ring and the inner section, and all points of connection are preferably located in substantially the same circle.

17 designates the outer section and 18 the inner section, the outer section being annular and the inner section preferably angular as triangular. 19 designates the fibrous ring connecting the inner and outer sections, it being connected to the inner section at the corners of such section 18, and to the outer section midway between such corners. The outer section is preferably divided radially into segments 20 and 21 and these segments are faced on opposite sides thereof with friction disks or plates 22 of any suitable material. The segments 20 alternate with the segments 21 and are secured to the fibrous disk 19, while the segments 21, which are located at the corners of the inner section 18 are unattached to the fibrous ring 19.

The segments 20 and 21 are usually arranged in pairs and the slot or cut which separates the paired sections terminates short of the inner edge of the segments 20 and 21, leaving a narrow neck 21ª which connects the paired sections.

The friction plates are secured to the segments in any suitable manner as by rivets extending through holes 23 in the sections 20 and 21. The sections 20, which are secured to the fibrous disk 19, are provided with inward extensions at 24, while the segments 21, which are opposed to the corners of the inner section 18, are cut away or not provided with such extensions; and the extensions 24 of the segments 20 are secured to the fibrous ring as by fastening members or rivets 25 extending through the extensions 24, and the ring and clips or plates 26 overlying the rear face of the ring 19 and each having an angular lug 27 engaging the periphery of the disk 19. These extensions 24 are offset rearwardly out of the plane of the major parts of the segments 20. Also the portions 28 of the segments 20 which portions are opposed to the margin of the ring 19 are similarly offset. The inner section 18 is similarly secured at its corners to the fibrous disk 18 by rivets 29 and plates 30. The inner section 18 is secured to a flange 31 on the hub 6 in any suitable manner as by rivets 32.

In operation, the driving force or torque is transmitted to the shaft 3 through the flexible fibrous ring 19, which absorbs engine noises and vibrations. The segmental construction of the outer section 17 contributes to the flexible action of the disk 19.

In Figures 6 and 7 the driven element is shown as provided with a pair of flexible disks 33 between the hub 34 and the outer disk 35, the flexible disks being arranged on opposite sides of the disk 35 and on opposite sides of the disk 36, which is attached to the hub as by rivets 37. The disk 35 is formed with a triangular opening therein and the plate 36 is triangular in general form and located within the triangular opening of the disk 35. The fibre disks 33 are secured to the disk 35 between the angles of the triangular opening by fastening members as rivets 38 and the fibre disks 33 are secured to the corners of the plate 36 by similar fastening members or rivets 39, these rivets 38, 39 being arranged in a circle concentric with the axis of the driven element or the hub 34. The plate 35 is provided with the usual friction disks 40 on opposite sides thereof.

In Figures 8, 9 two flexible or fibrous disks are shown connecting the inner and outer annular parts of the driven element and these fibrous disks are secured to the inner and outer parts or annular plates of the driven element by fastening members or rings in concentric circles instead of in the same circle.

In Figures 8, 9, 41 designates the hub of the driven element which has an annular plate or disk 42 connected thereto by rivets 43, 44, is the outer annular disk or plate having friction disks 45 on opposite sides thereof, 46 are the fibrous or flexible disks between the plates 42 and 44 to transmit the torque from one to the other, these fibrous or flexible disks 46 lapping opposite faces of the inner margin of the plate 44 and the opposite sides of the outer margin of the plate 42 being secured to the plates 44 and 42 by fastening members or rivets 47, 48 extending through the fibrous or flexible disks 46 and the margins of the plates 44 and 42 respectively. The fastening members or rivets 48 are arranged in a circle within and concentric with the circle in which the rivets 47 are located. Suitable metal annular plates 49, 50 are interposed between the heads of the rivets 47 and the outer margins of the fibrous disks 46 and between the heads of the rivets 48 and the inner margins of the fibrous disks 46.

In Figures 10, 11 the flexible or fibrous disks are shown as carried by the driving element or the fly wheel, instead of being embodied wholly in the driven element. 51 is the driving element or flywheel. 52 is the hub of the friction plate 53, which hub is secured to the driven shaft, the plate 53 having friction disks 54 thereon. 55 is a flexible or fibrous torque transmitting disk, this being secured to the driving element or flywheel 51 at a plurality of points spaced equidistant apart, here shown as at three points, it being secured to the flywheel at such three points, as by bolts 56 and nuts 57 threading thereon. It is, also, secured to a metal ring or disk 58 at three spaced-apart points located midway between the bolts 56, the fibrous disk 55 being secured to the plate 58 by bolts 59 and nuts 60. The fibrous disk is thus secured to the flywheel or driving element 51 at spaced apart points and at other spaced apart points to the disk 58 with which the driven element coacts.

The operation of the constructions shown in Figures 6, 7, 8, 9, 10, 11 is the same as that shown in Figures 1, 2, the driving force or torque being transmitted to the driven shaft through a fibrous ring or rings which absorb engine noises and vibrations.

What I claim is:

1. In a clutch, the combination of driving and driven elements, one of which is shiftable into and out of engagement with the other, and a shaft upon which one of the elements is mounted, said shaft being alined with and having a bearing in the other element, the element mounted on the shaft comprising inner and outer concentrically mounted spaced-apart sections, the outer section being spaced-apart from the shaft, and a comparatively stiff member of fibrous material between the sections, and means for securing said member to both sections.

2. In a clutch, the combination of driving and driven elements, one of said elements being provided with inner and outer concentrically-mounted, spaced-apart sections, the outer section being divided into segments, a ring of fibrous material arranged to transmit the motion from one section to the other, means connecting the segments together, means connecting some of the segments to the ring and other segments located between those so connected to the ring being unattached to the ring, and means connecting the inner section to the ring.

3. In a clutch, the combination of driving and driven elements, one of said elements being provided with inner and outer concentrically-mounted, spaced-apart sections, the outer section being divided into segments, a ring of fibrous material arranged to transmit the motion from one section to the other, means connecting the segments together, means connecting some of the segments to the ring and other segments located between those so connected to the ring being unattached to the ring, and means connecting the inner section to the ring, the connecting means being spaced-apart in a direction around the axis of the clutch and the connections between the ring and the inner section alternating with those between the ring and the outer section.

4. In a clutch, the combination of driving and driven elements, one of said elements comprising inner and outer concentrically-mounted, spaced-apart sections, and the outer section being divided substantially radially into segments, a friction ring secured to the faces of the segments, a fibrous ring between the inner and outer sections and serving to transmit the motion from one to the other, means connecting some of the segments to the fibrous ring, other segments between those so connected to the fibrous ring, being unattached to such fibrous ring, means connecting the fibrous ring to the inner section, the last mentioned connecting means alternating with the first mentioned connecting means and such connecting means being spaced-apart in a direction about the axis of the clutch.

5. In a clutch, the combination of driving and driven elements, one of said elements comprising an outer annular section and an inner angular section, the sections being concentrically-mounted with the inner edge of the outer section, spaced-apart from the outer edge of the inner section, the inner edge of the outer section being angular and the corners of the inner angular section being located in and close to the inner edge of the outer section, a ring of fibrous material connecting the sections, means connecting the fibrous ring to the inner section at the corners thereof and means connecting the fibrous ring and the outer section between the former means which connect the fibrous ring to the corners of the inner section.

6. In a clutch, the combination of driving and driven elements, one of said elements comprising an outer annular section and an inner angular section, the sections being concentrically-mounted with the inner edge of the outer section spaced-apart from the outer edge of the inner section, the outer section being divided in radial directions into segments, a ring of fibrous material connecting the sections, means connecting the fibrous ring to the inner section at the corners thereof and means connecting the fibrous ring and outer segmental section between the former means which connect the fibrous ring to the corners of the inner section.

In testimony whereof, I have hereunto signed my name at Syracuse, in the county of Onondaga, and State of New York, this 12th day of July 1923.

JOHN L. BURNS.